Sept. 17, 1968      H. A. McMASTER      3,402,037
PIVOTAL CONVEYOR ATTACHMENT FOR MOVING GLASS SHEETS OVER A
HOT GASEOUS SUPPORT BED
Filed March 26, 1965      2 Sheets-Sheet 1
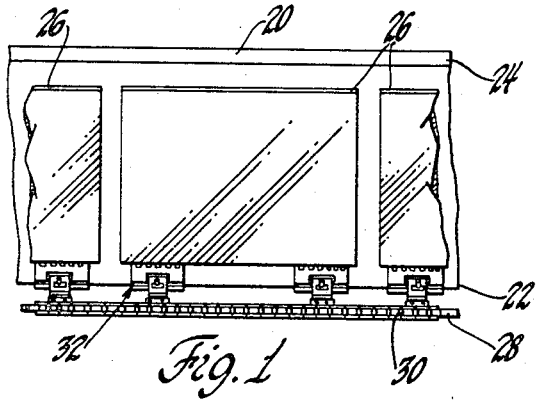
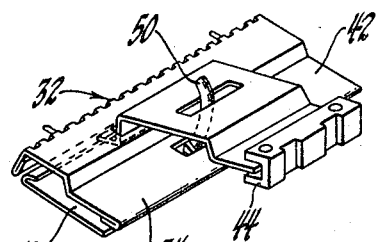
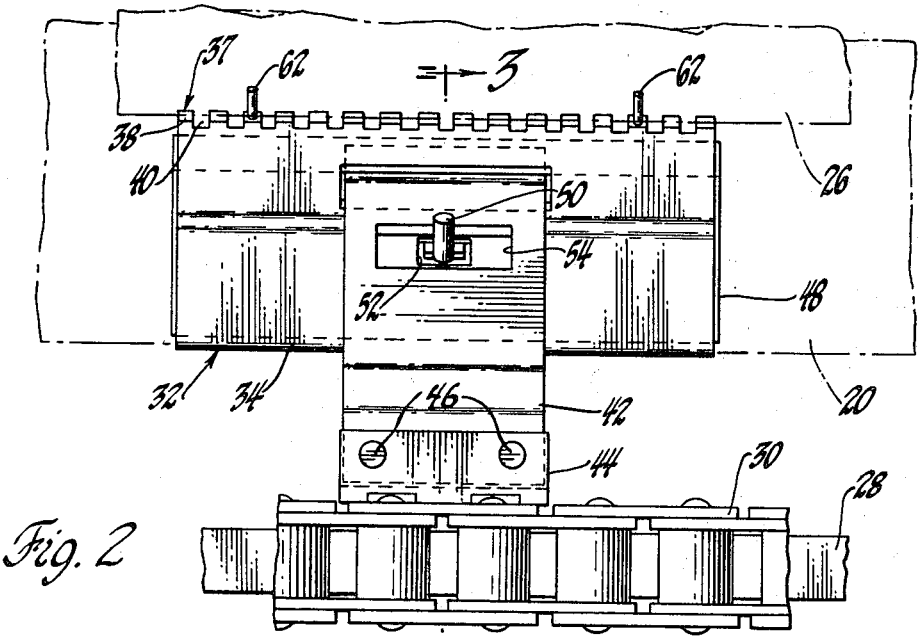
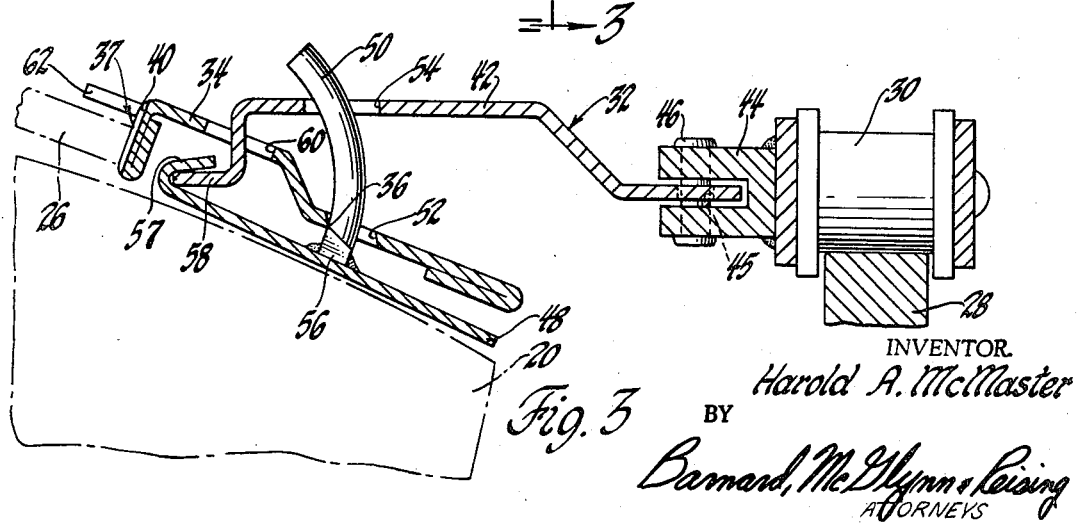
INVENTOR.
Harold A. McMaster
BY
Barnard, McGlynn & Reising
ATTORNEYS

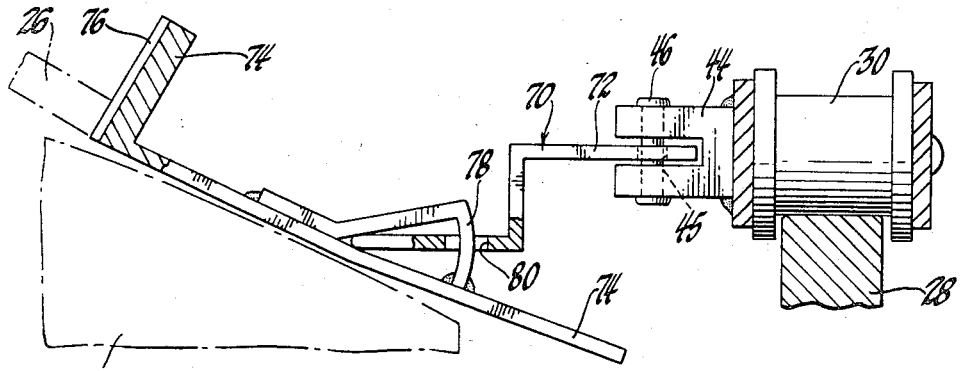
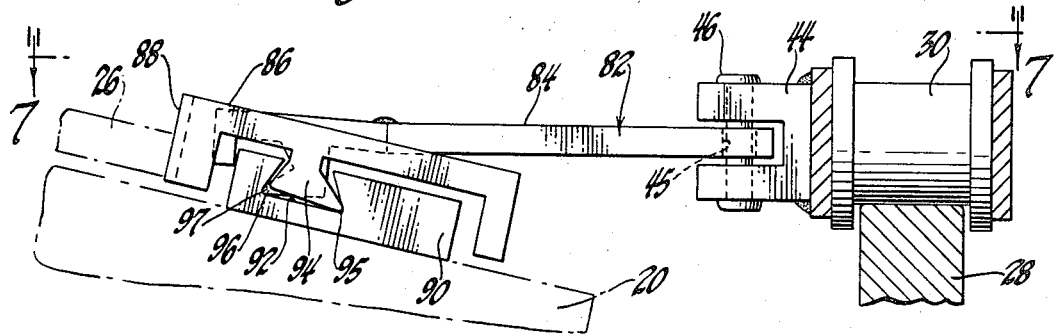
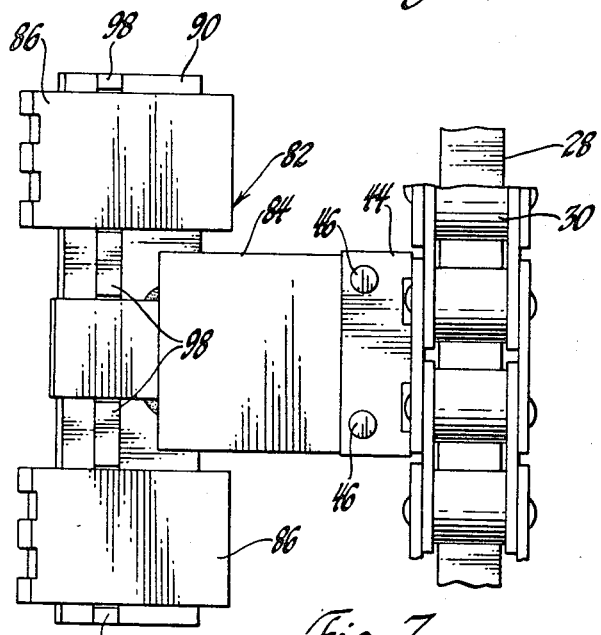
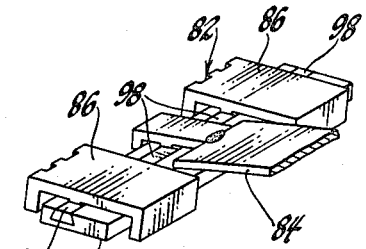

United States Patent Office 3,402,037
Patented Sept. 17, 1968

3,402,037
PIVOTAL CONVEYOR ATTACHMENT FOR MOVING GLASS SHEETS OVER A HOT GASEOUS SUPPORT BED
Harold A. McMaster, Woodville, Ohio, assignor to Permaglass, Inc., Woodville, Ohio, a corporation of Ohio
Filed Mar. 26, 1965, Ser. No. 443,028
13 Claims. (Cl. 65—182)

ABSTRACT OF THE DISCLOSURE

An apparatus for conveying articles and, more particularly, to a conveyor attachment having means engageable with an article to be moved including a link pivotally connected at one end to the conveyor for pivotal movement in a plane transverse the direction of movement of the conveyor and operatively connected at the other end to the means for engaging the article so that the means may pivot relative to the link in a plane transverse the movement of the conveyor, so that as the means moves the article, the article may be disposed at various different vertical distances relative to the conveyor without slippage occurring between the means and the article being moved.

---

More specifically, the attachment of the instant invention is particularly suitable for use with a conveyor utilized in furnaces for treating glass of the type disclosed in United States Patent 3,332,759 in the names of Harold A. McMaster and Norman C. Nitschke and assigned to the assignee of the present invention.

In the aforesaid United States patent, there is disclosed and claimed an improved method and apparatus for manufacturing curved tempered glass sheets on a continuous basis. In accordance with that invention, the glass sheets to be tempered are moved along an elongated perforated bed which extends through a heating furnace and then through a cooling blasthead, the surface of the bed within the furnace being shaped to provide the shape desired of the glass sheets. The glass sheets are floated on the bed portion within the furnace by hot gases emitted from the perforations therein, the gas temperature being at or above the deformation temperature of the glass. The bed has a portion which has a flat upper surface, a portion which has a varying degree of transverse curvature, and a portion which has a constant degree of transverse curvature. Also, one longitudinal portion of the bed is lower than the other so that each sheet of glass is floated at an angle with the horizontal plane to create a component of force due to the weight of each sheet to urge each sheet toward the lower edge of the bed. A conveyor is disposed adjacent the lower edge of the bed and has an attachment for frictionally engaging the lower edge of a floating sheet of glass so as to move the glass along the bed. As the glass sheet is moved along the bed, it is floated at different distances above the bed. Furthermore, as the sheet moves along the bed and is heated by the hot gases to deformation temperature such that the sheet conforms to the contour of the bed, the edge of each sheet adjacent the lower edge of the bed falls away from the conveyor so that there is a greater vertical distance between the edge of each sheet of glass and the conveyor as each sheet of glass moves along the varying transversely curved portion of the bed.

In operation then, a sheet of glass is placed on a blanket of hot gases above the flat portion of the bed, which is tilted at an angle with the horizontal so that the sheet of glass is disposed at an angle to create a component of force to urge the sheet toward the lower edge of the bed. The conveyor attachment then frictionally engages the lower edge of the sheet of glass so as to move the sheet of glass along the bed as the sheet of glass floats thereabove. The sheet of glass is relatively cool at first and therefore is floated at a relatively high distance above the bed so as to prevent contact between the bed and the glass; but as the sheet moves through the furnace, it is heated to its deformation temperature so that as the sheet passes over the curved portion of the bed, which has an increasing degree of transverse curvature, the sheet of glass deforms to conform to the curvature of the bed. Also, when the sheet of glass has reached its deformation temperature, it is floated at a closer distance to the bed. As the sheet of glass moves along the portion of the bed having an increasing degree of transverse curvature, the lower edge of the sheet of glass is disposed at an increasing vertical distance away from the conveyor. Finally, the sheet of glass is moved over the portion of the bed having a constant degree of transverse curvature and then through a blasthead where the sheet is cooled by and supported by room temperature air emitted from that portion of the bed within the blasthead.

The conveyor attachment disclosed in the aforesaid United States patent includes a link extending laterally from the conveyor having an L-shaped pad member pivotally connected to the end thereof. The L-shaped member is pivotally connected to the end of the link with one leg disposed substantially normal to that portion of the surface of the bed over which the leg travels. The leg of the L-shaped member, which is substantially normal to the surface of the bed over which it travels, frictionally engages the lower edge of a sheet of glass to move the sheet along the bed. The pivot point between the link and the L-shaped member is at a constant distance both vertically and horizontally from the conveyor, since there is no pivotal connection between the link and the conveyor. The only movement the L-shaped pad member is capable of, therefore, is pivotal movement about the end of the link.

Since the L-shaped pad member may only pivot about its pivotal connection to the end of the link, the leg of the pad member, which is substantially normal to the surface of the bed, is in fact disposed at various angles with the surface of the bed over which it travels, which angles are less than and greater than 90° as the attachment moves along the length of the bed. This angle varies due to the fact that the bed has a flat portion, a portion having an increasing degree of transverse curvature, and a portion having a constant degree of transverse curvature. When the angle between the leg of the pad member and the surface of the bed over which it travels is greater than 90°, so that the angle between the leg and the edge of the sheet of glass abutting thereagainst is greater than 90°, the sheet of glass has a tendency to ride up on the leg of the pad member as the sheet is floating along the bed. If the sheet rides up on the leg of the pad member, the edge of the sheet may be injured due to the slipping or relative movement between the edge of the sheet and the leg of the L-shaped pad member.

Likewise, if the angle between the leg of the L-shaped pad member, which engages the edge of a sheet of glass, and the surface of the bed, is less than 90°, so that the angle between the leg of the L-shaped member and the edge of the sheet of glass engaging the member, is less than 90°, the edge of the sheet of glass has a tendency to ride down on the leg of the L-shaped member to be wedged between the leg of the L-shaped member and the surface of the bed. It is extremely important that no contact whatever be made between the glass sheet and the bed since this contact causes scratching, marring, and marking of the glass sheet. When glass is tempered, it is extremely difficult and expensive to remove the scratches, mars, or marks by polishing or any other manner.

As alluded to previously, the sheets of glass are floated relatively high over the bed when they have not yet reached their deformation temperature and are rigid and then are lowered to float closer to the bed once they have reached their deformation temperature so that they may easily conform to the configuration of the bed. This necessitates either a pivotal movement of the L-shaped pad member to allow the edge of the sheet to lower or the edge of the sheet must slip downwardly on the L-shaped pad. As mentioned above, if the edge of the sheet slips downwardly relative to the L-shaped pad member, the portion of the edge of the glass in contact with the pad member tends to remain in position on the pad member while the remainder of the sheet sags or lowers to conform to the curvature of the bed thereby creating bulbous protrusions or humps in the edge of the sheet of glass. If the L-shaped pad member pivots about its connection to the end of the link so as to allow the sheet of glass to lower, the intersection of the two legs of the L-shaped pad moves downward and may contact the surface of the bed to cause injury either to the L-shaped pad member or to the surface of the bed.

Furthermore, as the glass sheet moves up and down relative to the L-shaped pad member, the component of force urging the sheet against the pad member tends to create moments to pivot the L-shaped pad member relative to the link. That is to say, if the sheet of glass engages the L-shaped pad member relatively high on the leg which engages the edge of the sheet of glass, there is created a moment tending to rotate the pad member in one direction relative to the link and if the sheet of glass engages the pad member relatively low, there is created a moment tending to rotate the pad member in the opposite direction. There is a point at which the edge of the sheet of glass may contact the leg of the pad member which engages the edge of a sheet of glass so that the component of force urging the sheet of glass against the pad member acts through the pivotal point so that there is no moment tending to pivot the pad member in either direction.

It is, therefore, an object and feature of the present invention to provide an attachment for a conveyor which may be utilized in a furnace of the type described in the aforementioned patent whereby a surface of the attachment frictionally engages the lower edge of the sheet of glass so that the sheet of glass may be floated at various distances above the bed as it moves thereover while the surface of the attachment engaging the sheet remains at all times substantially normal to that portion of the surface of the bed which is substantially below the contact between the sheet and the attachment so that there is no slipping or relative movement between the edge of the sheet of glass and the attachment.

Another object and feature of the present invention is to provide an apparatus for conveying a sheet of material, which sheet is floating at various distances above and along a bed and at an angle with a horizontal plane as so to create a component of force due to the weight of the sheet to urge the sheet toward one edge of the bed, including an attachment operatively connected to a conveyor for pivotal movement about a point substantially in line with the direction in which the component of force urging the sheet toward the edge of the bed acts, so that the sheet of material may be moved along the bed as it floats at various distances above the bed by frictional contact with the attachment so that there is no relative movement between the attachment and the edge of the sheet of glass.

In general, these and other objects of this invention may be attained by an attachment constructed in accordance with this invention including a link adapted to be connected at a first end thereof to a conveyor for pivotal movement in a plane transverse to the direction of movement of the conveyor, and connected at the other end to a means frictionally engageable with articles to be moved. The link is operatively connected to the means for moving the article to allow pivotal movement of the means relative to the link in a plane transverse to the movement of the conveyor. The point about which the means pivots relative to the link is disposed such that a force applied to the means by an article to be moved will not create a moment to cause the means to pivot relative to the link.

Other objects and attendant advantages of the present invention will be readily appreciated as the same becomes better understood by reference to the following detailed description when considered in connection with the accompanying drawings wherein:

FIGURE 1 is a plan view showing an attachment of the instant invention moving floating sheets of glass along a bed;

FIGURE 2 is an enlarged plan view of one preferred embodiment of the present invention shown in FIGURE 1;

FIGURE 3 is an enlarged cross-sectional view taken along line 3—3 of FIGURE 2;

FIGURE 4 is an isometric view of the attachment shown in FIGURES 1 through 3;

FIGURE 5 is an enlarged view partly in cross section of another preferred embodiment of the present invention;

FIGURE 6 is an enlarged view partly in cross section of yet another preferred embodiment of the present invention;

FIGURE 7 is a view taken along line 7—7 of FIGURE 6 in reduced scale; and

FIGURE 8 is an isometric view of the attachment shown in FIGURES 6 and 7.

There is shown in FIGURE 1 an elongated bed 20. The bed 20 is shown in phantom in FIGURES 2 and 3. The bed has a portion along which the curvature varies from flat to a predetermined degree of transverse curvature. The bed also has one longitudinal edge 22 which is lower than the other edge 24.

Serially arranged spaced sheets of glass 26 are shown floating over the bed on a blanket of hot gases in FIGURE 1. A sheet of glass 26 is shown in phantom in FIGURES 2, 3, 5 and 6. Since the bed 20 is at an angle with the horizontal plane, the respective sheets of glass 26 float above the bed at an angle with a horizontal plane to create a component of force due to the weight of each sheet to urge each sheet toward the lower edge 22 of the bed. A conveying means, including a rail 28 and a chain 30, is disposed adjacent the lower edge 22 of the bed.

An attachment, generally shown at 32, moves the respective floating sheets 26 along the bed 20. The attachment 32 includes a sheet engaging means 34 for movement along the lower edge 22 of the bed 24 by the conveyor or chain 30. The means 34 comprises a pad member frictionally engageable with the edge of a sheet of glass 26 so as to move the floating sheet of glass along the bed 20. The pad member 34, like the other members of the embodiments to be described hereinafter, is operatively connected to the conveyor chain 30 so that the pad member 34 may pivot about a point 36 so that the component of force acting against the pad member 34 due to the weight of the glass sheet 26, acts through the pivotal point 36 so that no moments will be created to pivot the pad member 34. That is to say, the resultant vector of the component of force due to the weight of the glass sheet 26 acts against the pad member 34 along a line in a direction passing through the pivot point 36 so that there is no moment created tending to cause the pad member 34 to pivot.

The pad member 34 has a corrugated surface, generally shown at 37. The corrugated surface 37 has a series of vertical lands and grooves 38 and 40 respectively. The corrugated surface 37 allows gases to pass between the pad member 34 and the edge of the respective glass sheets 26.

The pad member 34 is operatively connected to the conveyor chain 30 by a link 42. The link 42 is pivotally connected at one end to the slotted member 44 by bolts or rivets 46. The slotted member 44 is welded or secured in any other appropriate manner to the chain 30. The link 42 has a pair of holes 45 in the end thereof through which the rivets 46 are secured. The holes 45 in the link 42 are larger than the diameter of the rivets 46 so that the link 42 is free to pivot in a vertical plane or a plane which is transverse to the movement of the conveyor chain 30.

The link 42 is operatively connected at the other end thereof to the pad member 34 to allow pivotal movement of the pad member 34 relative to the link 42 in a plane transverse the movement of the conveyor chain 30. The connector plate 48 operatively connects the other end of the link 42 to the pad 34. An arcuate post 50 extends from the connector plate 48 through an aperture 52 in the pad member 34. The link 42 also has an aperture 54 through which the arcuate post 50 may extend. Stop means comprising the stops 56 are disposed on each side of the post 50 for engaging the pad member 34 to limit the downward movement of the pad 34. The stops 56 are shaped so that they have a knife edge 36. The stops 56, therefore, engage the pad member 34 on each side of the aperture 52 in line contact along the knife edge 36 so that the pad member 34 may pivot about the knife edge relative to the connector plate. The aperture 52 has walls shaped so that the pad member 34 engages the post 50 in knife edge contact. Therefore, the stops 56 engage the pad member 34 in line contact and the pad member 34 engages the post 50 in line contact. Also, the line contact between the pad member 34 and the stops 56 lies in an imaginary straight line which contains the line contact between the pad member 34 and the post 50 whereby the pad member 34 always pivots about a line of knife edge contact with the arcuate post 50 or the stops 56.

A sheet of glass 26 is shown in phantom in FIGURE 3 in contact with the corrugated surface 37 of the pad member 34. It will be noted that the knife edge contact at 36 between the pad member 34 and the arcuate post 50 is substantially in line with the median or the middle of the thickness of the floating glass sheet. In this position, the component of force due to the weight of the glass sheet urging the glass sheet against the pad member 34 acts substantially along an imaginary line which passes through the pivotal point 36 thereby preventing any moments from occurring which would tend to pivot the pad member 34.

The connector plate 48 has a V-shaped lip 57 along an edge which extends in a direction substantially parallel to the direction of movement of the conveyor chain 30. The link 42 has a flange 58 which extends through the aperture 60 in the pad member 34. The flange 58 terminates at the apex within the V-shaped lip 57 thereby providing a connection between the connector plate 48 and the link 42 so that the connector plate 48 may pivot relative to the link 42 in a plane which is transverse to the direction of movement of the conveyor chain 30. Since the connector plate 48 pivots about the apex of the V-shaped lip 57, the arcuate post 50 follows the circumference of an imaginary circle which has its center at the apex of the V-shaped lip 57.

The pivotal connections between the link 42 and the conveyor chain 30 and between the link 42 and the pad member 34, therefore, allow the pad member 34 to be disposed at various vertical distances relative to a point on the conveyor yet maintain non-slipping contact so that there is no relative movement between the sheet of glass 26 and the corrugated surface 37 on the pad member 34 as the sheet is being moved.

Preferably, the attachment 32 is made of sheet metal and when fabricated for use in a furnace of the type described in the aforementioned patent, the length of the corrugated surface 37 is approximately four inches. The connector plate 48 is approximately four inches long and an inch and a half wide. Preferably, the connector plate 48, as shown in FIGURE 3, is made of sheet metal so that it floats as it moves over the bed 20. Therefore, the entire attachment 32 floats with the sheet of glass 26 as it moves the sheet of glass over the bed 20 by frictional engagement therewith.

As noted hereinbefore, the glass sheet 26 floats at various distances above the bed 20 as the sheet moves along the bed. It is necessary that the edge of the glass sheet contact the corrugated surface 37 and remain in contact therewith without slipping or moving relative to the surface 37 as the sheet is floated over the entire length of the bed 20. Yet, the edge of the sheet must move downward to float at closer distances above the bed while at the same time the corrugated surface 37 must be disposed substantially normal to that portion of the bed directly below the contact between the glass sheet and the surface 37. The pivotal connections between the link 42 and the conveyor and between the link 42 and the pad member 34 allow the pad member 34 to move up and down relative to the bed with the glass sheet whereby the pad member 34 is maintained in a disposition so that the component of force due to the weight of the glass urging the glass against the pad member 34 will act substantially through the pivot point 36 thereby preventing moments from being created which would tend to pivot the pad member 34 relative to the link 42. In actual practice, when the attachment 32 is utilized in the furnace of the type described in the aforementioned patent, the pivotal point 36 is at a design height of approximately 5/16 inch above the bed surface and the pivotal connection between the link 42 and the conveyor allows the pivotal point 36 to change distances above the bed in a range of plus or minus one-quarter of an inch. The pad member 34 is also fabricated such that it is balanced about the pivotal point 36 or counterweighted slightly in favor of the corrugated surface end of the pad member 34.

As alluded to previously, the glass sheets are, during the first portion of their movement of the bed, floated relatively high therefore. In order to prevent a sheet of glass from slipping off the upper extremity of the corrugated surface 37 and to allow the pad member 34 to move up with the sheet of glass when the sheet is floated relatively high above the bed, an extension or a pair of protrusions 62 are provided.

Another embodiment of the present invention is shown in FIGURE 5, wherein there is disclosed an attachment, generally shown at 70. The conveying means is the same as the conveying means shown in FIGURES 1 through 4 and includes a rail 28 upon which rides a chain 30. A slotted member 44 is secured to the chain 30.

The attachment includes a link 72, which is pivotally mounted to the slotted member 44 by a pair of bolts or rivets 46. The holes 45 in the link 72 through which the rivets 46 pass are large enough to allow the link to pivot relative to the conveyor in a plane transverse the movement of the conveyor chain 30. The attachment 70 also includes an L-shaped means comprising the pad member 74 which is engageable with an article to be moved. The pad member 74 has a corrugated surface 76 having lands and valleys similar to the lands 38 and valleys 40 of the corrugated surface 37 of the attachment 32 shown in FIGURES 1 through 4. The links 72 is operatively connected at the other end to the pad member 74 by the member 78. The member 78 is secured to the pad member 74 by welding or brazing or in any other appropriate manner. The link 72 terminates at the apex formed between the member 78 and the pad 74. The pad 74 pivots relative to the link 72, in a plane transverse the movement of the conveyor chain 30, about the point of contact between the end of the link 72 and the apex formed by the member 78 and the pad 74. The link 72 has an aperture 80 through which an arcuate portion of the member 78 is disposed and may move as the pad member 74 pivots. The attachment 70, like the attachment 32 shown in FIGURES 1 through 4, is preferably made of sheet metal so that it floats above the surface of the bed as it frictionally engages a sheet of glass to move the floating sheet of glass along the bed surface.

A third embodiment of the invention is shown in FIGURES 6 through 8. The attachment, generally shown at 82, is adaptable for connection to the same type conveying means disclosed in FIGURES 1 through 5, which includes a rail 28, a chain 30, and a slotted member 44 secured to the chain 30.

The attachment 82 includes a link 84 connected at one end to the slotted member 44 by the bolts or rivets 46. The holes 45 in the link 84 are larger than the diameter of the rivets 46 so that the link 84 is free to pivot relative to the conveyor in a plane transverse to the movement of the conveyor chain 30.

The attachment 82 includes a means comprising the pad members 86 which are frictionally engageable with an edge of a sheet of glass for moving the sheet of glass along the bed. The pad members 86 each have a corrugated surface 88 having lands and valleys like the lands 38 and valleys 40 of the corrugated surface 37 of the attachment 32, shown in FIGURES 1 through 4.

A connector plate 90 operatively connects the other end of the link 84 to the pad members 86 so that the pad members 86 may pivot relative to the link 84 in a plane transverse the movement of the conveyor chain 30. The connector plate 90 has a dovetail slot 92 extending thereacross in a direction substantially parallel to the direction of movement of the conveyor chain 30. Each pad member 86 has a triangular-shaped portion 94 extending therefrom. The triangular-shaped portion 94 is not of the same shape as the dovetail slot 92 so that it loosely rests in the dovetail slot 92 to provide for pivotal movement of each pad member 86 relative to the link 84. The link 84 has a generally triangular-shaped portion 96 extending therefrom. The triangular-shaped portion 96 also loosely rests in the dovetail slot 92 to allow relative pivotal movement between the connector plate 90 and the link 84.

The attachment 82 includes retaining means for preventing the triangular-shaped portions 94 and 96 from moving along the dovetail slot 92. The retaining means comprises a plurality of plugs 98. Each plug 98 conforms to the shape of the dovetail slot 92. There is a plug disposed in the slot at each end of the connector plate 90. There is also a plug secured in the dovetail slot 92 between each triangular-shaped portion 94 and the triangular-shaped portion 96, that is, between each pad member 86 and the link 84. The plugs 98 are retained in the dovetail slot 92 by an appropriate means such as by a force fit or by a screw (not shown) passing through the connector plate 90 to engage each plug 98.

Unlike the two embodiments illustrated in FIGURES 1 through 5, the attachment illustrated in FIGURES 6 through 8 does not float as it moves along the bed. Rather, the attachment 82 is preferably made of steel or the like to provide rigidity and so that the connector plate 90 slides along the surface of the bed.

As is illustrated in FIGURE 6 each pad member 86 pivots relative to the connector plate 90 about the contact point between one corner 95 of the dovetail slot 92 and the triangular-shaped portion 94. The triangular-shaped portion 94 is disposed in the connector plate 90 so that the point about which each pad member 86 pivots is substantially in line with the median or mid point of the thickness of a sheet of glass which engages the surface 88. By so disposing the pivotal point, the component of force due to the weight of the sheet of glass urging the sheet of glass against each pad member 86 will not create moments tending to rotate the pad members 86 relative to the link 84. Therefore, each pad member 86 will only pivot relative to the link 84 when the vertical distance between the sheet of glass and the conveyor changes, which in turn causes the link 84 to pivot relative to the conveyor. The relative pivotal movement between the link 84 and the connector plate 90 is about the contact point between the triangular-shaped portion 96 and its engagement with the other corner 97 of the dovetail slot 92.

Therefore, each pad member 86 frictionally engages a sheet of glass to move the sheet of glass along the bed without allowing slipping or relative movement between the edge of the sheet of glass and each pad 86 even though the vertical distance of the sheet of glass relative to the conveyor changes as the glass moves along the bed.

It is clear, therefore, that in its broader aspects, the invention encompasses an attachment for a conveyor of the type for moving an article along a surface by frictional contact with the article. The attachment utilizes a link or its mechanical equivalent, which is connected at one end to a conveyor for pivotal movement in a plane transverse the direction of movement of the conveyor and pivotally connected at another end to a means which is frictionally engageable along a surface thereof with the article to be moved so that the means may pivot relative to the link in a plane transverse to the movement of the conveyor. The attachment, therefore, may move an article over a surface by frictional contact with the article without allowing slipping or relative movement between the means and the article even though the vertical distance between the article and the conveyor changes as the article is moved between spaced points. That is to say, the attachment may be disposed at various distances above the bed but it will not rotate relative to the bed so that the surface of the attachment which engages the sheet of glass will always be substantially normal to the surface of the bed over which it travels.

Although the invention has been illustrated and described as particularly suitable in a furnace of the type set forth in the aforementioned patent application wherein sheets of glass are treated, the present invention is also suitable for use with a conveyor for moving various other articles and sheets of material.

The invention has been described in an illustrative manner and it is to be understood that the terminology which has been used herein is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. An apparatus for treating serially arranged spaced sheets of glass comprising: an elongated bed; means for supplying a blanket of hot gases for supporting sheets over said bed; said elongated bed being tilted about its longitudinal axis so that one longitudinal edge of the bed is lower than the other for floating each sheet of glass at an angle sufficient to create a componet of force due to the weight of each sheet to urge each sheet toward the lower edge of the bed; conveying means disposed adjacent the lower edge of the bed for movement along said bed; a link pivotally connected at a first end thereof to said conveying means for pivotal movement in a plane transverse to the direction of movement of said conveying means; a connector plate connected to said link adjacent a second end of said link and disposed over said bed; means presenting a surface for frictionally engaging an edge of a sheet of glass and pivotally connected to said connector plate.

2. An apparatus as set forth in claim 1 wherein said connector plate has a dovetail slot extending thereacross in a direction parallel to the direction of movement of said conveying means, said means having a triangular-shaped portion extending therefrom and loosely resting in said dovetail slot for allowing said pivotal movement of said means, and retaining means for preventing said triangular-shaped portion from moving along said dovetail slot.

3. An apparatus as set forth in claim 2 wherein said second end of said link has a generally triangular-shaped portion extending therefrom and loosely resting in said dovetail slot for allowing relative pivotal movement between said connector plate and said link in a plane transverse the direction of movement of said conveying means, and wherein said retaining means prevents movement of said triangular-shaped portion of said link from moving along said dovetail slot.

4. An apparatus as set forth in claim 3 wherein said means comprises at least two members disposed on either side of said link with each member having a triangular-shaped portion loosely resting in said dovetail slot, said retaining means comprises a plurality of plugs each of which conforms to the shape of said dovetail slot, said plugs being secured in each end of said dovetail slot and in said dovetail slot between each of said members and said link.

5. An apparatus as set forth in claim 1 wherein, said connector plate has an arcuate post extending therefrom, said means having an aperture through which said arcuate post extends, stop means on said post for engaging said means in line contact to limit downward movement of said means and to allow said means to pivot thereabout relative to said connector plate, and said aperture being formed so that said means contacts said post in line contact.

6. An apparatus as set forth in claim 5 wherein said line contact between said means and said stop means lies in an imaginary straight line which contains the line contact between said means and said post so that knife edge contact is established with said means.

7. An apparatus as set forth in claim 6 wherein said connector plate has a V-shaped lip along one edge thereof, said edge extending in a direction substantially parallel to the direction of movement of said conveying means, said means having a second aperture therethrough, and said second end of said link having a flange extending through said second aperture and terminating at the apex within said V-shaped lip so that said connector plate may pivot relative to said link in a plane transverse the direction of movement of said conveying means.

8. An apparatus as set forth in claim 7 wherein said link has an aperture through which said arcuate post may move upon pivotal movement of said plate.

9. An apparatus as set forth in claim 8 wherein said arcuate post follows the circumference of an imaginary circle which has a center within said apex of said V-shape lip on said connector plate.

10. An apparatus as set forth in claim 1 wherein said surface presented by said means is a corrugated surface which engages the edge of a sheet of glass to allow gases to pass between said means and the edge of the sheet of glass.

11. An apparatus as set forth in claim 1 wherein said means floats on gases above said bed as said means moves therealong.

12. An apparatus as set forth in claim 1 wherein said connector plate slides along said bed.

13. An apparatus as set forth in claim 1 including means on said surface presented by said means and engageable with a sheet of glass in the event a sheet of glass slips upwardly on said surface.

References Cited

UNITED STATES PATENTS 2,676,696   4/1954   Gerhartz     198—170
3,223,501  12/1965  Fredley et al.     65—182

DONALL H. SYLVESTER, *Primary Examiner.*

ARTHUR D. KELLOGG, *Assistant Examiner.*